United States Patent
Yoshimura et al.

(10) Patent No.: US 8,234,487 B2
(45) Date of Patent: Jul. 31, 2012

(54) SERVER APPARATUS AND STARTUP CONTROL METHOD

(75) Inventors: Yasuhiko Yoshimura, Tachikawa (JP); Shuichi Sato, Sagamihara (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/073,769

(22) Filed: Mar. 28, 2011

(65) Prior Publication Data

US 2011/0271089 A1    Nov. 3, 2011

(30) Foreign Application Priority Data

Apr. 30, 2010   (JP) ................................ 2010-105620

(51) Int. Cl.
*G06F 15/177* (2006.01)
(52) U.S. Cl. ............... 713/2; 713/1; 713/100; 709/222; 714/38.1
(58) Field of Classification Search ............ 713/1, 2, 713/100; 709/222; 714/38.1
See application file for complete search history.

(56) References Cited

U.S. PATENT DOCUMENTS

| | | | | |
|---|---|---|---|---|
| 7,234,052 B2 * | 6/2007 | Lee et al. ........................ | 713/2 |
| 7,861,074 B2 * | 12/2010 | Choi ................................. | 713/2 |
| 8,019,985 B2 * | 9/2011 | Coupigny et al. ................ | 713/2 |
| 2002/0059507 A1 | 5/2002 | Hironaka | |

FOREIGN PATENT DOCUMENTS

| | | |
|---|---|---|
| JP | 05037629 | 2/1993 |
| JP | 07099674 | 4/1995 |
| JP | 2000-207178 | 7/2000 |
| JP | 2000-276337 | 10/2000 |
| JP | 2002149495 | 5/2002 |
| JP | 2008040964 | 2/2008 |

* cited by examiner

*Primary Examiner* — Thuan Du
(74) *Attorney, Agent, or Firm* — Blakely, Sokoloff, Taylor & Zafman LLP

(57) ABSTRACT

According to one embodiment, a server apparatus includes a communication processor, a database and a controller. The communication processor starts up based on a startup program recorded in a processing memory, and performs a communication processing based on a service program recorded in the processing memory, after startup. The database stores the startup program in association with a first directory for specifying a first memory area, and stores the service program in association with a second directory for specifying a second memory area different from the first directory, The controller refers to the second directory stored in the database after the startup program starts, and reads the service program from the database based on the referred result, and further, records the read program in second memory area of the processing memory.

18 Claims, 5 Drawing Sheets

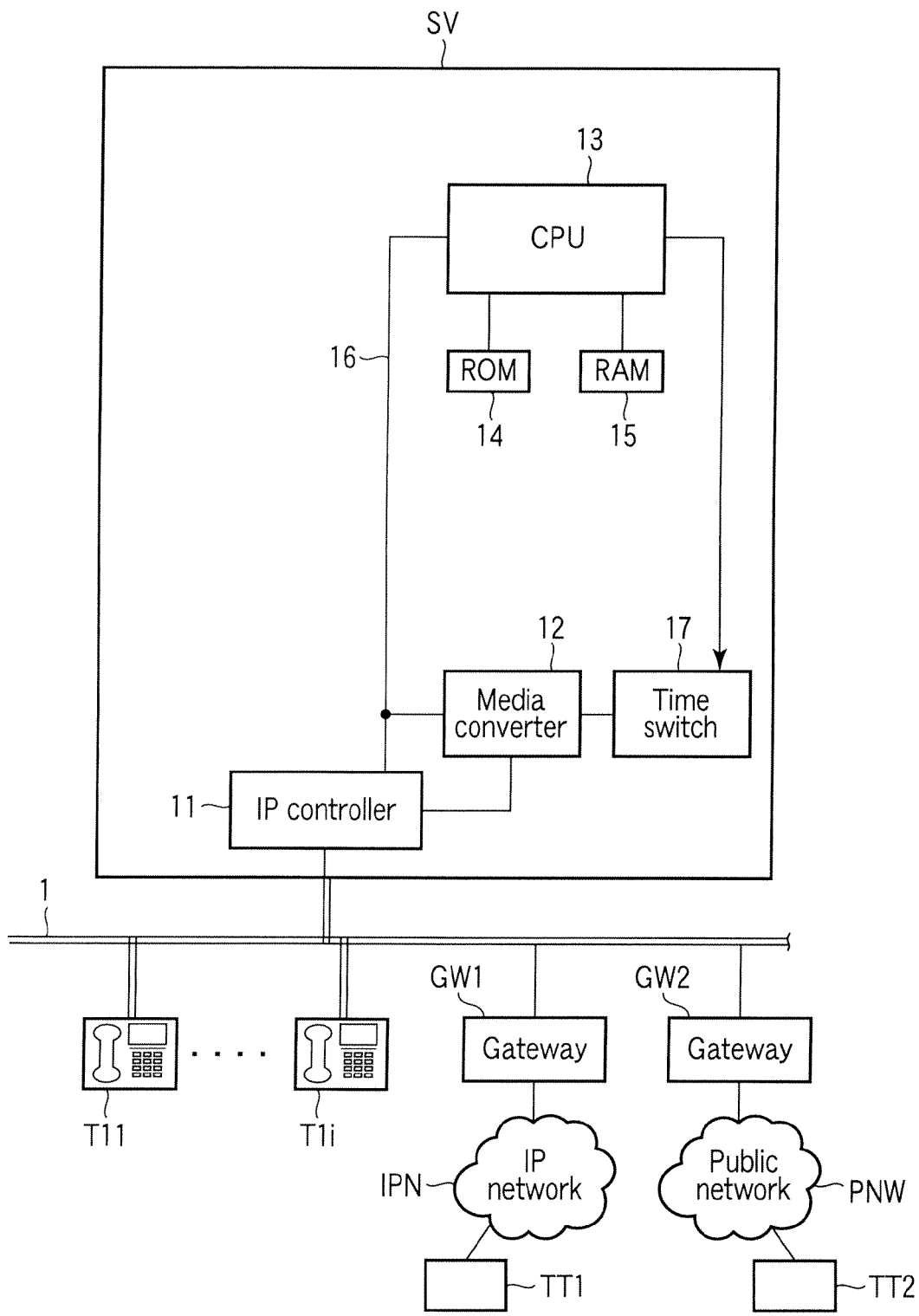
F I G. 1

| / | | | | | | | | | | |
|---|---|---|---|---|---|---|---|---|---|---|
| | ... | | | | | | | | | Top root directory — 100 |
| | lib | | | | | | | | | OS startup/init process library — 170 |
| | | lib c_.so | | | | | | | | |
| | | ... | | | | | | | | |
| | current | | | | | | | | | Current root directory — 140 |
| | | ... | | | | | | | | |
| | | lib | | | | | | | | Call processing · Media processing library — 144 |
| | | | lib c_.so | | | | | | | |
| | | | ... | | | | | | | |
| | | usr | | | | | | | | |
| | | | bin | | | | | | | |
| | | | | call_process | | | | | | Call processing execution file — 1413 |
| | | | | media_process | | | | | | Media processing execution file — 1414 |
| | | | | ... | | | | | | |
| backup | | | | | | | | | | Backup root directory (having same configuration as current root directory) — 150 |
| base | | | | | | | | | | Base root directory (having same configuration as current root directory) — 160 |

F I G. 3

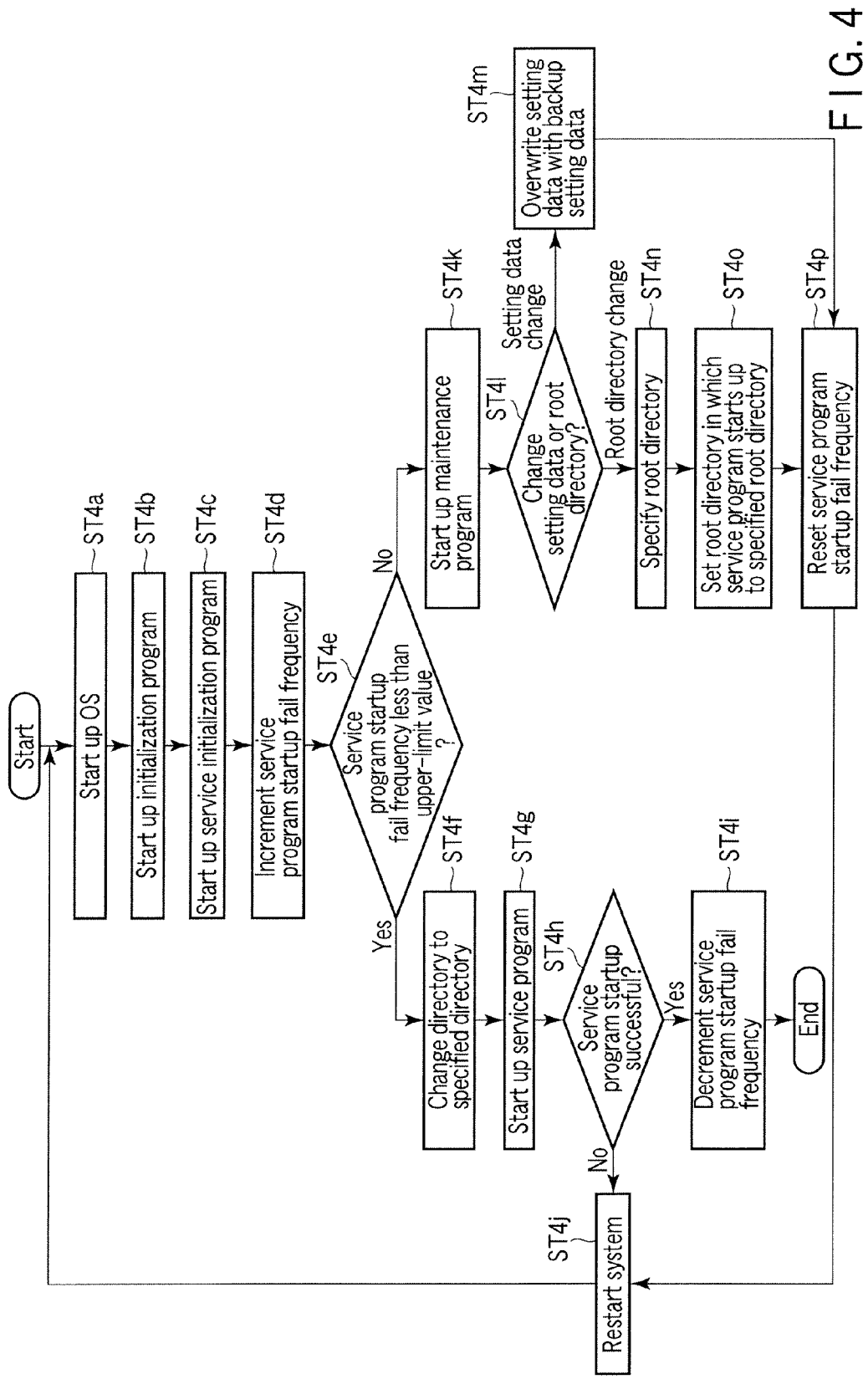
F I G. 4

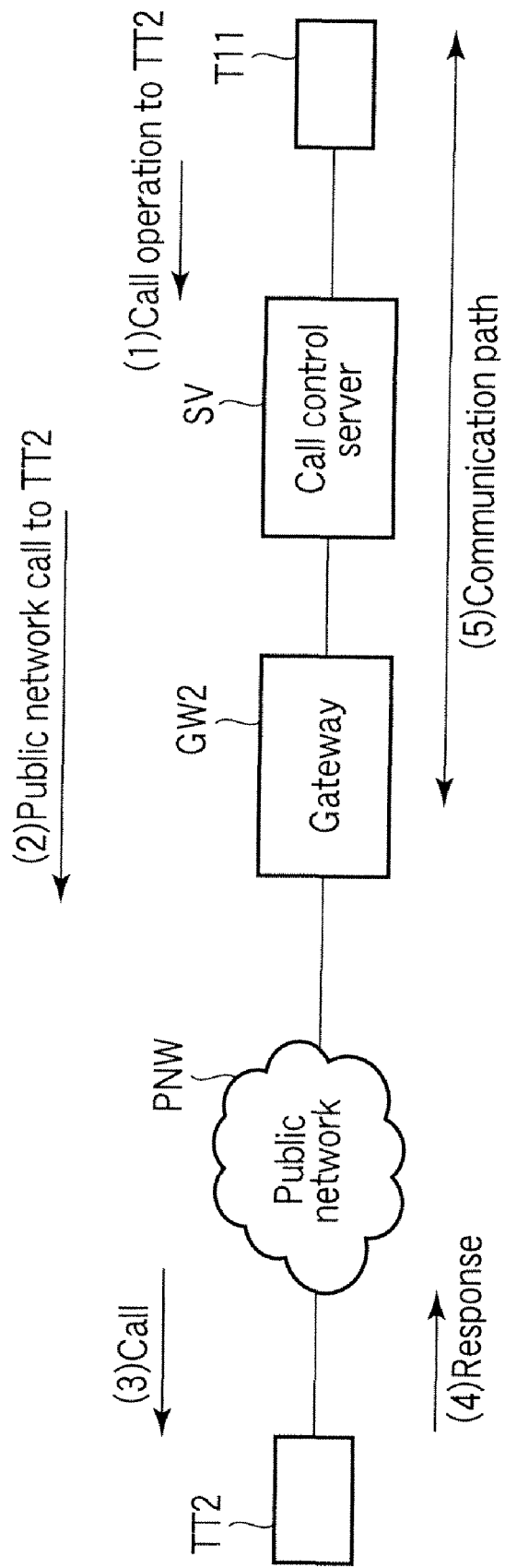
F I G. 5

SERVER APPARATUS AND STARTUP CONTROL METHOD

CROSS-REFERENCE TO RELATED APPLICATIONS

This application is based upon and claims the benefit of priority from Japanese Patent Application No. 2010-105620, filed Apr. 30, 2010; the entire contents of which are incorporated herein by reference.

FIELD

Embodiments described herein relate generally to a server apparatus used for an Internet Protocol (IP) telephone system, and to a startup control method used for a server apparatus.

BACKGROUND

In recent years, an IP telephone system has come into wide use. For example, according to the IP telephone system, an IP telephone terminal is connected to an IP network including a local area network (LAN) and Internet. A call control server on the IP network executes a protocol conversion and a data format conversion. In this way, voice communication is possible between IP telephone terminals and an IP telephone terminal and a general telephone network.

In general, the foregoing call control server includes a controller using a microcomputer. The controller collectively controls the operation of the call control server. Moreover, the controller includes a system startup program such as an operating system (OS) on control hardware. The controller executes a service program given as a communication control application program on the OS environment, and thereby, is configured to operate hardware.

In the foregoing call control server, the system startup program and the service program starts up in a memory area, which is the same program execution environment. For this reason, the failure of the service program gives an influence to the system startup program and a system startup processing; as a result, the system startup becomes incomplete.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a block diagram showing the configuration of one embodiment of an IP telephone system to which a server apparatus according to one embodiment is applied;

FIG. 3 is a view to explain a root directory path structure of a program handled in one embodiment;

FIG. 4 is a flowchart to explain the control procedure by a CPU for recovering a service program failure in one embodiment; and FIG. 5 is a sequence view showing a communication connecting procedure between an IP telephone terminal and an external terminal on a public network in one embodiment.

DETAILED DESCRIPTION

Figure 2:
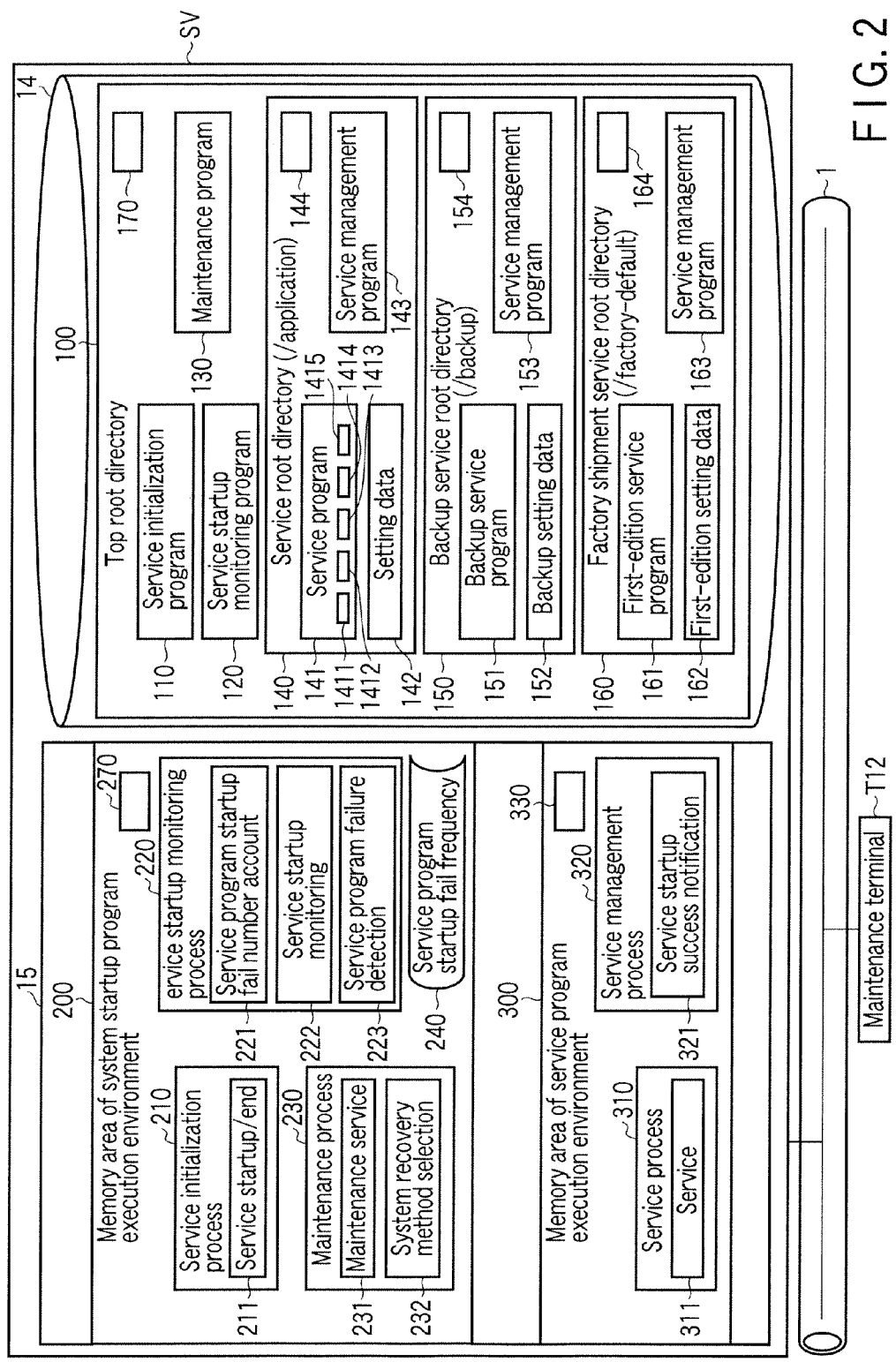
FIG. 2 is a block diagram showing the software configuration of a call control server shown in FIG. 1.

Various embodiments will be described hereinafter with reference to the accompanying drawings. In general, according to one embodiment, a server apparatus comprising: a communication processor configured to start up based on a startup program recorded in a processing memory, and perform a communication processing based on a service program recorded in the processing memory, after startup; a database configured to store the startup program in association with a first directory for specifying a first memory area, and store the service program in association with a second directory for specifying a second memory area different from the first directory, wherein the first memory area is provided as a program execution environment for starting up the startup program on the processing memory; and a controller configured to refer to the second directory stored in the database after the startup program starts, and read the service program from the database based on the referred result, and further, record the read program in second memory area of the processing memory.

One embodiment of the case where a server apparatus is applied to a call control server of an IP telephone system will be described below. FIG. 1 is a block diagram schematically showing the configuration of an IP telephone system according to one embodiment.

The foregoing system has a packet communication local area network (LAN) 1 as an IP network. The LAN 1 is connected with IP telephone terminals T11 to T1$i$ (i=natural numbers). In this case, the foregoing IP telephone terminals T11 to T1$i$ have a call processing module and a video media information processing module.

Moreover, the LAN 1 is connected with gateways GW1 and GW2. Gateway GW1 makes a connection between the LAN 1 and an IP public network IPN such as Internet. Further, gateway GW1 has communication protocol and signal format conversion functions between the LAN 1 and the IP public network IPN. Gateway GW2 makes a connection between the LAN 1 and a public network PNW such as an analog telephone network. Further, gateway GW2 has communication protocol and signal format conversion modules between the LAN 1 and the public network PNW.

The foregoing IP telephone terminals T11 T1$i$ and gateways GW1, GW2 are connected to a call control server SV by way of the LAN 1. The call control server SV has an exchange control module between a plurality of IP telephone terminals T11 to T1$i$ or between IP telephone terminals T11 to T1$i$ and IP public network IPN and public network PNW. According to the exchange control module, session is established according to a predetermined protocol such as SIP, Megaco and H.323. According to the established session, an RTP packet is transmitted and received between sender and receiver telephone terminals; in this way, voice communication is performed.

In the foregoing call control server SV, a system startup program and a service program start up in a memory area, which is the same program execution environment. For this reason, a service program failure gives an influence to the system startup program and the system startup; as a result, the system startup becomes incomplete. For example, a service program 1 is updated, and in addition, a shared library having a dependency relationship is updated. In this case, a service program 2, which starts up in the system startup, refers to the shared library; however, the dependency relationship is not correctly set. Namely, if the service program 2 is not updated, the service program 2 is not normally operated in the system startup, and thus, hung up; as a result, the system startup becomes incomplete. Moreover, the service program includes an operation of rewriting a file to which the system startup program refers. In this case, the foregoing file is destroyed due to a service program failure, and thus, the system startup program does not normally start up; as a result, the system startup becomes incomplete.

A virtualization technique is given as already-existing means for separating a memory area, which is assigned as a program execution environment; however, virtualization software is required.

Moreover, a program starts up in a single user mode, and thereby, it is possible to specify a starting-up program. However, this is a means for solving a problem after the system startup becomes incomplete; for this reason, it is impossible to prevent the foregoing problem. In this case, a maintenance worker goes to the place having a problem, and then must change a program to a backup program and restores backup data.

For this reason, there is a need to provide a server apparatus, which is configured so that a service program failure does not give an influence to a startup processing, and to provide a startup control method. According to this embodiment, there is provided a call control server SV, which executes a startup control method such that a service program failure does not give an influence to a startup processing.

A call control server SV includes an IP controller 11, a media converter 12, a central processing unit (CPU) 13, a read-only memory (ROM) 14 functioning as a database, and a random access memory (RAM) 15 functioning as a processing memory. The foregoing IP controller 11, media converter 12 and CPU 13 are mutually connected by way of a data highway 16.

The IP controller 11 is connected with a LAN 1 as the necessity arises. The IP controller 11 executes an interface processing between the connected LAN 1 and the controller 11. Further, the IP controller 11 makes various control information exchanges related to the foregoing interface processing between the CPU 13 and the controller 11 by way of the data highway 16.

The media converter 12 is connected with a time switch 17. The media converter 12 processes control packet and voice packet, which are received by the IP controller 11. Further, the media converter 12 converts the foregoing packets into a PCM signal, and thereafter, outputs the signal to the time switch 17. Furthermore, the media converter 12 converts a PCM signal from the time switch 17 into a packet, and thereafter, outputs the packet to the IP controller 11.

The CPU 13 reads various programs stored in the ROM 14, and then records them in the RAM 15, and further, executes a processing based on the programs recorded in the RAM 15. In this way, the CPU 13 collectively controls each of the foregoing IP controller 11, media converter 12 and time switch 17 to realize an operation as a call control server SV.

FIG. 2 is a block diagram showing each configuration of a program stored in the foregoing ROM 14 and RAM 15.

Various programs stored in the ROM 14 include a system startup program such as a general OS. There exists a plurality service programs executed on the system startup program. The foregoing system startup program and service programs are recorded in a memory area, which is provided as the same program execution environment of the RAM 15, by the CPU 13. If an operation failure occurs in a service program, the operation failure gives an influence to the system startup program. So, a method for recording the system startup program and the service programs in an independent memory area in the RAM 15 is used. The foregoing method is used, and thereby, various programs are stored in the ROM 14. Specifically, a service initialization program 110 belonging to the system startup program, a service startup monitoring program 120, a maintenance program 130 and a shared library 170 are stored in the ROM 14. In this case, these programs are stored in associated with a top root directory 100 for specifying a memory area 200 provided as a system startup program execution environment of the RAM 15. Moreover, a service program 141 other than the system startup program, a setting data 142, a service management program 143 and a shared library 144 are stored in the ROM 14. In this case, these programs are stored in associated with a service root directory 140 for specifying a memory area 300 provided as a system startup program execution environment of the RAM 15.

The service initialization program 110 is a program for executing an already-known startup processing. The service startup monitoring program 120 is a program for monitoring whether or not the service program 141 starts up. The maintenance program 130 is a program for recovering an operation failure if the operation failure occurs in the service program 141. The shared library 170 is data showing the startup procedure of each program.

For example, the service program 141 is composed of an exchange processing program group, and a various program groups 1415 for executing a communication management processing such as charging and communication history data management. The foregoing exchange processing program group is composed of a call processing terminal control program 1411, a call processing group control program 1412, a call processing service program 1413 and a media processing program 1414.

The setting data 142 is data for setting the service program 141 to the memory area 300 of the RAM 15. The service management program 143 is a program for managing the startup and end of the service program 141. The shared library 144 is data for making a reference to determine which of service programs 1411 to 1415 should be started up when a service request related to an exchange processing is made.

Moreover, the ROM 14 is stored with a backup service root directory 150 and a factory shipment service root directory 160. In this case, the backup service root directory 150 specifies a memory area, which is provided as a program execution environment, different from memory areas 200 and 300 on the RAM 15. The foregoing service program 151, setting data 152, service management program 153 and shared library 154 corresponding to the backup service root directory 150 are the same as the foregoing service program 141, setting data 142, service management program 143 and shared library 144 corresponding to the service root directory 140.

The CPU 13 reads the foregoing service initialization program 110, service startup monitoring program 120, maintenance program 130 and shared memory 170, which correspond to the top root directory 100 of the ROM 14, and then records them in the memory area 200 of the RAM 15. According to the foregoing operation, a service initialization process 210, a service startup monitoring process 220, a maintenance process 230 and a shared library 270 are generated in the memory area 200.

Moreover, the CPU 13 reads the foregoing service program 141, setting data 142, service management program 143 and shared library 144, which correspond to the service root directory 140 of the ROM 14, and then records them in the memory area 300 of the RAM 15. According to the foregoing operation, a service process 310, a service management process 320 and a shared library 330 are generated in the memory area 300.

The operation executed by the foregoing configuration will be described below.

First, when the system startup program and service program stored in the ROM 14 is associated with a directory, for example, the user of an IP telephone terminal T12 functioning as a maintenance terminal operates IP telephone terminal T12 to set a path with respect to each program.

FIG. 3 is a view showing a path setting structure of each program. The user of IP telephone terminal T12 registers "/" with respect to the top root directory 100 of the ROM 14. Further, the user of IP telephone terminal T12 registers "/lib" with respect to the shared library 170 belonging under the top root directory 100. Furthermore, the user of IP telephone terminal T12 registers "current/user/bin/call process" with respect to the call processing service program 1413 belonging under the service root directory 140.

Then, when a power switch (not shown) is turned on and the supply of power is started, the CPU 13 starts a control processing.

FIG. 4 is a flowchart to explain the control processing executed by the CPU 13. When starting the control processing, the CPU 13 starts up an operating system (OS) (block ST4a). The CPU 13 refers to the shared library 170 of the ROM 14 to start up the service initialization program 110 and the service startup monitoring program 120 in the memory area 200, which is provided as a system startup program execution environment of the RAM 15 (block ST4b). Then, the service initialization process 210 and the service startup monitoring process 220 are generated in the memory area 200 (block ST4c). In this case, to start up a program in a memory area implements that the CPU 13 reads a program from the ROM 14, and then records the program in a memory area of the RAM 15.

The CPU 13 increments a service program startup fail frequency 240 to "+1" in the service startup monitoring process 220 (block ST4d). Then, the CPU 13 determines whether or not the service program startup fail frequency 240 exceeds the upper-limit value (block ST4e).

In this case, the service program startup fail frequency 240 does not exceed the upper-limit value (Yes). Therefore, the CPU 13 specifies the service root directory 140 in the service initialization process 210 so that the service management program 143 belonging under the service root directory 140 starts up in the memory area 300 (block ST4f). The service program 141 is operated in the memory area 300 according to the service management program 143, and thereby, service management process 320 and service process 310 are generated in the memory area 300 (block ST4g). In this case, s specifying root directory path is set using an environmental variable, and then the maintenance program 230 changes the path.

The CPU 13 determines whether or not the startup of the service program 141 succeeds (block ST4h). If the foregoing startup succeeds (Yes), the CPU 13 gives a service startup success notification to the service startup monitoring process 220. Then, the service startup monitoring process 220 decrements the service program startup fail frequency 240 to "−1" (block ST4i).

Conversely, if the startup of the service program 141 fails (No), the service program 310 resets the system, or the service startup monitoring process 220 determines that the startup of the service program 141 fails, and restarts the system (block ST4j).

In the foregoing block ST4e, if the system reset is frequently executed and the service program startup fail frequency 240 exceeds the upper-limit value, the CPU 13 executes the following procedure. Specifically, the CPU 13 reads the maintenance program 130 from the ROM 14 in the service initialization process 210, and then records the read program 130 in the system startup program memory area 200 of the RAM 15 to generate the maintenance program 230 in the memory area 200 (block ST4k). The maintenance program 230 sends a recovery message showing a change of setting data or service root directory to IP telephone terminal T21 as a system recovery method, and then displays the message on a screen (i.e., on-screen display [OSD]).

In the foregoing state, the maintenance worker inputs an instruction to change the setting data in IP telephone terminal 112. Whereupon, the CPU 13 shifts the state from block ST4l to block ST4m, and therein, in the maintenance process 330, the setting data is over-written with backup setting data.

On the other hand, if the maintenance worker selects a change of root directory, the CPU 13 designates a root directory for specifying a memory area, which is provided as a program execution environment, different from the memory area 300 in the maintenance process 330 (block ST4n). Thereafter, the CPU 13 changes an environmental variable of the root directory path of the service program 141 of the ROM 14 to a designated path (block ST4o). Namely, the CPU 13 changes the root directory path "/current/user/bin/call process" of the call processing service program 1413 having a failure to "/xxxx/user/bin/call process". In this case, the foregoing "xxxx" is used for specifying a memory area, which is provided as a program execution environment, different from memory areas 200 and 300 of the RAM 15, and predetermined by the maintenance program 130.

The CPU 13 resets the service program startup fail frequency 240 (block ST4p), and then shifts the state to the procedure of the foregoing block ST4j to restart the system.

The case of making a communication connection between an IP telephone terminal T11 and a telephone terminal TT2 on the public network PNW will be described below.

FIG. 5 is a sequence view showing the procedure of making a communication connection.

For example, the user of IP telephone terminal T11 makes a call operation from IP telephone terminal T11 with respect to the external terminal TT2 (see FIG. 5 (1)). Whereupon, an on-hook operation by IP telephone terminal T11 is analyzed by the IP controller 11 of the call control server SV, and then transferred as an on-hook signal to the CPU 13 by way of the data highway 16 from the IP controller 11.

When the foregoing on-hook signal is transferred, in the CPU 13, a service program 141 required for the foregoing processing is started up by the shared library 330 generated in the memory area 300. In this case, according the on-hook signal of IP telephone terminal T11, the call processing terminal program 1411 is started up, and then a terminal processing with respect to IP telephone terminal T11 is executed by the program 1411.

According to the call processing terminal program 1411, a signal for sending a dial tone to IP telephone terminal T11 called from the CPU 13 to the time switch 17 is transferred. Moreover, a control signal for permitting the accept of a dial signal with respect to the IP controller 11 from the CPU 13. The IP controller 11 sends a dial tone from the time switch 17 to the sender IP telephone terminal T11, and thereafter, receives a dial signal from IP telephone terminal T11.

In the foregoing state, when the user of IP telephone terminal T11 confirming a dial tone makes a dial operation, a dial signal is transferred to the CPU 13 by way of IP controller 11 and data highway 16.

In the CPU 13, a call destination is analyzed according to the foregoing dial signal. When it is recognized that the call destination is a public network PNW, the call processing service control program 1413 is started up by the shared library 330 generated in the memory area 300. Then, a calling message to the public network PNW is generated by the call processing service control program 1413, and thereafter, transferred to the IP controller 11. The IP controller 11 transmits the outgoing message to the public network PNW to the public network PNW by way of the LAN 1 and gateway GW2 (see FIG. 5 (2)).

A call to the receiver external terminal TT2 is made (see FIG. 5 (3)). When the external terminal TT2 makes a response to the outgoing call (see FIG. 5 (4)), the CPU 13 of the call control server SV executes a processing for connecting a communication path between the sender IP telephone terminal T11 and gateway GW2 (see FIG. 5 (5)). In this way, the user of IP telephone terminal T11 is able to make voice communication with the user of the external terminal TT2.

During the startup of the outgoing call processing terminal program 1411, if a group processing of IP telephone terminal T11 is required, the group processing is requested from the call processing terminal program 1411 to the call processing group processing program 1412 by way of the shared library 330. Moreover, if a connection is required between IP telephone terminals T11 and T13, a processing is requested from the call processing terminal program 1411 to the call processing control program 1413 by way of the shared library 330. In addition, if a media processing such as image transmission is required, the media processing program 1414 is started up by the shared library 330.

As described above, according to the foregoing embodiment, the service initialization program 110, service startup monitoring program 120 and maintenance program 130, which form the system startup program, are associated with the top root directory 100. Further, the service program 141, setting data 142 and service management program 143 are associated with the service root directory 140, and stored in the ROM 14. Therefore, at the startup, the foregoing service initialization program 110, service startup monitoring program 120 and maintenance program 130 are recorded in the memory area 200 of the RAM 15 so that a predetermined startup processing is executed. After the startup, the foregoing service program 141, setting data 142 and service management program 143 are read from the ROM 14, and then recorded in the memory area 300 different from the startup program of the RAM 15 so that a communication is performed according to the service program.

In this way, it is possible to prevent the failure of the service program 141 from giving an influence to a startup processing.

Further, according to the foregoing embodiment, if a normal startup completion notification is not received after a predetermined time elapses from the startup of the service program 141, an operation failure of the service program 141 is automatically determined, and then restart is executed. Therefore, this serves to prevent an influence given by the operation failure of the service program 141; as a result, it is possible to previously the occurrence of system down.

Further, according to the foregoing embodiment, even if system reset resulting from the service program 141 frequently occurs, the maintenance program 130 only is started up. Therefore, information showing the occurrence of failure is transferred to IP telephone terminal T12 of the maintenance worker so that the information is given to the maintenance worker. Therefore, the maintenance worker can immediately know that a failure occurs in the service program; as a result, necessary means such as a recovery operation can be quickly taken.

Further, according to the foregoing embodiment, after the occurrence of failure is notified, either of a change to backup setting data or a change to a designated directory of the directory of the service program is executed in accordance with the instruction input by the maintenance worker.

Therefore, it is possible to analyze the failure of the service program 141, and to make a change to a backup program, and further, to restore backup data; as a result, a rescue disk is not required.

Other Embodiment

The foregoing embodiment has been described giving the call control server of the IP telephone system. For example, an information processing apparatus such as a personal computer and a system comprising a CPU and a general OS may be used.

According to the foregoing other embodiment, a startup program and a service program are associated with a mutually different directory, and then stored in a database. At the startup, the startup program is recorded in a program area corresponding to a processing memory so that a predetermined startup processing is executed. After the startup, the service program is read from the database, and then recorded in a program area different from the startup program of the processing memory, and in this way, a communication is performed according to the service program. Therefore, it is possible to prevent the failure of the service program 141 from giving an influence to a startup processing.

Besides, various modifications may be made in the configuration of a call control server, the configuration of software, the procedure of registering a directory with respect to each program, the control processing procedure of recovering an operation failure of a service program and its content without departing from the scope of the subject matter.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A server apparatus comprising:
   a communication processor configured to start up based on a startup program recorded in a processing memory, and perform a communication processing based on a service program recorded in the processing memory, after startup;
   a database configured to store the startup program in association with a first directory for specifying a first memory area, and store the service program in association with a second directory for specifying a second memory area different from the first directory, wherein the first memory area is provided as a program execution environment for starting up the startup program on the processing memory; and
   a controller configured to refer to the second directory stored in the database after the startup program starts, and read the service program from the database based on the referred result, and further, record the read program in second memory area of the processing memory.

2. The apparatus of claim 1, wherein the controller executes restart when a normal startup completion notification is not received from the service program after a predetermined time elapses from the startup of the service program.

3. The apparatus of claim 1, wherein the controller increments a startup fail frequency before the startup of the service program, and decrements the startup fail frequency when a normal startup completion notification is received from the service program after a predetermined time elapses from the startup of the service program.

4. The apparatus of claim 3, wherein the database stores a maintenance program for recovering an operation failure of the service program in association with the first directory, and
the controller starts up the maintenance program in the first memory area of the processing memory when the startup fail frequency exceeds a predetermined number, and gives a notification showing the occurrence of failure to an external side based on the maintenance program.

5. The apparatus of claim 4, wherein the database stores a backup setting data with respect to the service program in association with a third directory for specifying a third memory area different from the first memory area and the second memory area as program execution environment of the startup program and the service program, and stores a backup of the service program in association with a fourth directory for specifying a fourth memory area different from the first memory area and the second memory area and the third memory area and
the controller executes either of a change to a backup setting data or a change of the directory of the service program to the fourth directory as the backup of the service program based on the user's specified command, after the occurrence of failure has been notified.

6. The apparatus of claim 1, wherein the service program includes at least one of a call processing terminal control program, a call processing group control program, a call processing service program, a media processing program, a program for charging, and a program for executing a communication management processing.

7. A startup control method used for a server apparatus, comprising the method:
starting up based on a startup program recorded in a processing memory, and performing a communication processing based on a service program recorded in the processing memory, after startup,
storing the startup program in association with a first directory for specifying a first memory area in the database, and storing the service program in association with a second directory for specifying a second memory area different from the first directory in the database, wherein the first memory area is provided as a program execution environment for starting up the startup program on the processing memory; and
referring to the second directory stored in the database after the startup program starts, and reading the service program from the database based on the referred result, and further, recording the read program in the second memory area of the processing memory.

8. The method of claim 7, further comprises executing restart when a normal startup completion notification is not received from the service program after a predetermined time elapses from the startup of the service program.

9. The method of claim 7, further comprises incrementing a startup fail frequency before the startup of the service program, and decrementing the startup fail frequency when a normal startup completion notification is received from the service program after a predetermined time elapses from the startup of the service program.

10. The method of claim 9, wherein the storing comprises storing a maintenance program for recovering an operation failure of the service program in association with the first directory in the database, and
further comprises starting up the maintenance program in the first memory area of the processing memory when the startup fail frequency exceeds a predetermined number, and giving a notification showing the occurrence of failure to an external side based on the maintenance program.

11. The method of claim 10, wherein the storing comprises storing a backup setting data with respect to the service program in association with a third directory for specifying a third memory area different from the first memory area and the second memory area as program execution environment of the startup program and the service program in the database, and stores a backup of the service program in association with a fourth directory for specifying a fourth memory area different from the first memory area and the second memory area and the third memory area in the database, and
further comprises executing either of a change to a backup setting data or a change of the directory of the service program to the fourth directory as the backup of the service program based on the user's specified command, after the occurrence of failure has been notified.

12. The method of claim 7, wherein the service program includes at least one of a call processing terminal control program, a call processing group control program, a call processing service program, a media processing program, a program for charging, and a program for executing a communication management processing.

13. A information processing apparatus comprising:
a communication processor configured to start up based on a startup program recorded in a processing memory, and perform a communication processing based on a service program recorded in the processing memory, after startup;
a database configured to store the startup program in association with a first directory for specifying a first memory area, and store the service program in association with a second directory for specifying a second memory area different from the first directory, wherein the first memory area is provided as a program execution environment for starting up the startup program on the processing memory; and
a controller configured to refer to the second directory stored in the database after the startup program starts, and read the service program from the database based on the referred result, and further, record the read program in second memory area of the processing memory.

14. The apparatus of claim 13, wherein the controller executes restart when a normal startup completion notification is not received from the service program after a predetermined time elapses from the startup of the service program.

15. The apparatus of claim 13, wherein the controller increments a startup fail frequency before the startup of the service program, and decrements the startup fail frequency when a normal startup completion notification is received from the service program after a predetermined time elapses from the startup of the service program.

16. The apparatus of claim 15, wherein the database stores a maintenance program for recovering an operation failure of the service program in association with the first directory, and
the controller starts up the maintenance program in the first memory area of the processing memory when the startup fail frequency exceeds a predetermined number, and gives a notification showing the occurrence of failure to an external side based on the maintenance program.

17. The apparatus of claim 16, wherein the database stores a backup setting data with respect to the service program in association with a third directory for specifying a third memory area different from the first memory area and the second memory area as program execution environment of the startup program and the service program, and stores a backup of the service program in association with a fourth directory for specifying a fourth memory area different from the first memory area and the second memory area and the third memory area and the controller executes either of a change to a backup setting data or a change of the directory of the service program to the fourth directory as the backup of the service program based on the user's specified command, after the occurrence of failure has been notified.

18. The apparatus of claim 13, wherein the service program includes at least one of a call processing terminal control program, a call processing group control program, a call processing service program, a media processing program, a program for charging, and a program for executing a communication management processing.

* * * * *